United States Patent
Fukawa

(10) Patent No.: US 7,150,546 B2
(45) Date of Patent: Dec. 19, 2006

(54) VEHICLE LIGHT APPARATUS

(75) Inventor: Kiyotaka Fukawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 442 days.

(21) Appl. No.: 10/262,892

(22) Filed: Oct. 3, 2002

(65) Prior Publication Data

US 2003/0067763 A1    Apr. 10, 2003

(30) Foreign Application Priority Data

Oct. 4, 2001    (JP)    ............ P.2001-308349

(51) Int. Cl.
*B60Q 1/064*    (2006.01)
*B60Q 1/08*    (2006.01)

(52) U.S. Cl. .............. 362/464; 362/465; 362/466; 362/467

(58) Field of Classification Search ............ 362/276, 362/464, 465, 466; 315/80, 81, 79; 701/49
See application file for complete search history.

(56) References Cited

U.S. PATENT DOCUMENTS

| | | | |
|---|---|---|---|
| 5,404,278 A | 4/1995 | Shibata et al. | |
| 5,909,949 A * | 6/1999 | Gotoh | 362/37 |
| 6,049,749 A * | 4/2000 | Kobayashi | 701/49 |
| 6,726,349 B1 * | 4/2004 | Uchida | 362/466 |
| 6,805,472 B1 * | 10/2004 | Fukawa | 362/466 |
| 7,036,963 B1 * | 5/2006 | Fukawa | 362/465 |

FOREIGN PATENT DOCUMENTS

JP    6-15314 B2    3/1994

* cited by examiner

*Primary Examiner*—Sandra O'Shea
*Assistant Examiner*—Anabel Ton
(74) *Attorney, Agent, or Firm*—Sughrue Mion, PLLC

(57) ABSTRACT

A vehicle light apparatus which serves to change a lighting range of a lamp L for illuminating a forward part of the vehicle corresponding to a steering angle of the vehicle comprises lighting range control means for turning the lighting range into an opposite direction to a current steering direction when steering is returned into a straight running direction. When a steering angular velocity is greater than a predetermined value, a lighting range for illuminating an opposite side is increased following the return of the steering into the straight running direction. A next curve or the course of an intersection road can be illuminated prior to the steering operation in a running condition on an S-shaped road or an intersection road in which right and left turns continue. Thus, the vehicle light apparatus is very effective for maintaining the safe running of the vehicle on a curved road and an intersection road.

18 Claims, 10 Drawing Sheets

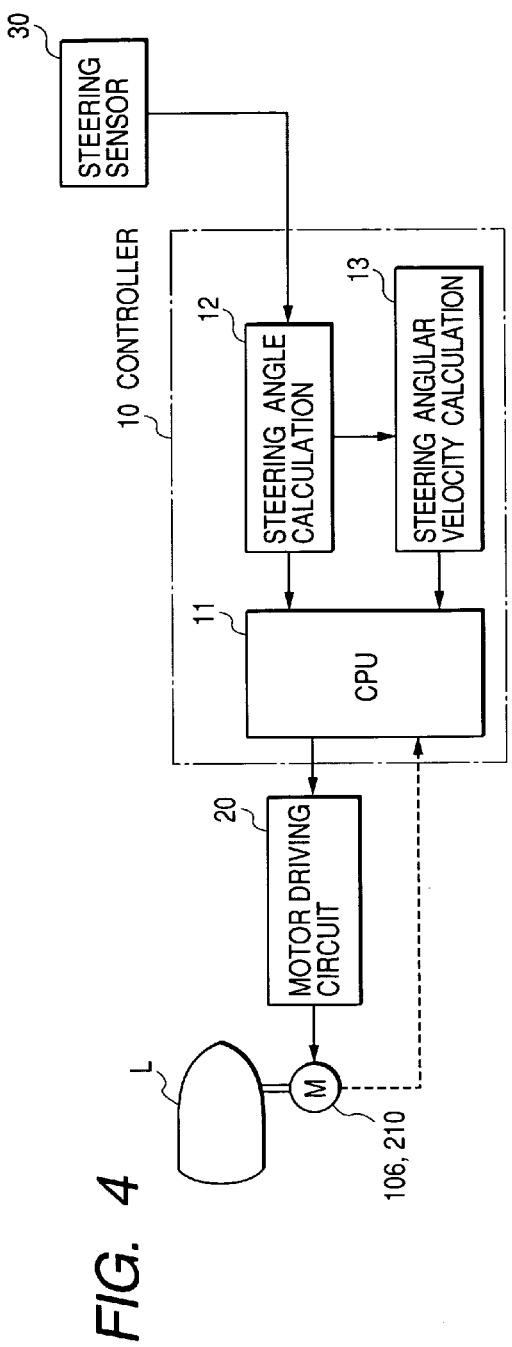
FIG. 4
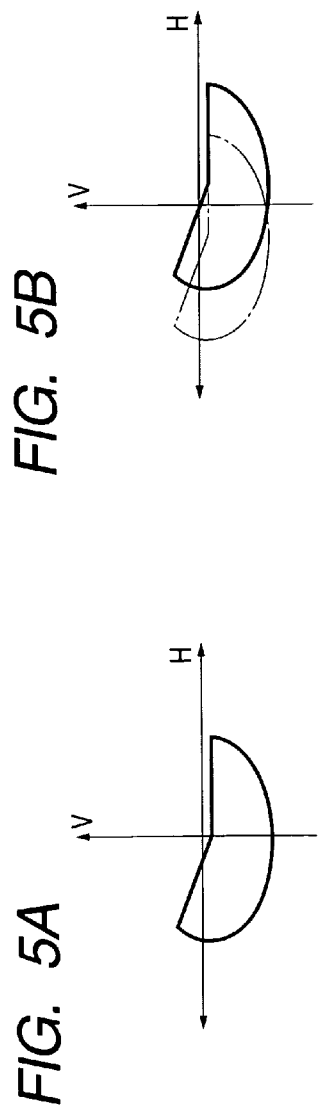
FIG. 5A
FIG. 5B

VEHICLE LIGHT APPARATUS

BACKGROUND OF THE INVENTION

The present invention relates to a lighting apparatus such as a headlamp or a fog lamp which illuminates the forward part of a vehicle such as a car, and more particularly to a vehicle light apparatus which has the function of controlling a change in a lighting direction or a lighting area of a lamp light corresponding to a running situation and can properly carry out lighting in order to realize the safe running of the vehicle.

In order to enhance the running safety of a car, it is necessary to illuminate the running direction of a vehicle. A lamp for illuminating the forward part of a car such as a conventional headlamp or fog lamp of the car is constituted to illuminate in the straight running direction of the car. In the case in which the car changes a course direction on an intersection road (a T-shaped road, a crossroad and so forth) or a curved road (an S-shaped road, a U-shaped road and so forth), therefore, the forward part of a course to be changed cannot be illuminated previously and a forward confirmation is carried out insufficiently so that there is a problem in respect of safe running. For such a problem, there has been proposed a lighting system in which a lighting range, that is, a lighting direction or a lighting area of a lamp is changed according to the steering operation of a car. For example, a lighting optical axis to be the lighting direction of a lamp for illuminating the forward part of a car can be changed transversely or a lighting area to be a range in which the lamp can carry out lighting can be changed, and furthermore, a steering angle (a steering angle of a steering wheel) which is closely related to the running direction of the car can be detected by a steering sensor for detecting the rotating angle of a steering wheel, for example, and the lighting direction of the lamp can be turned in the running direction of the car based on the detection output of the steering sensor or the lighting area can be enlarged in the running direction. Thus, the running direction of the car on an intersection road or a curved road can be illuminated previously, which is effective for safe running.

However, the conventional lighting system serves to simply control the lighting range according to a steering angle. For this reason, it is hard to carry out a proper lighting control to cope with various running situations of a car in some cases. For example, it is desirable that a driver should confirm the situation of a curved road in a running destination earlier than the execution of a steering operation. In the conventional lighting system in which the lighting range depends on the steering angle, however, it is hard to enlarge the lighting range in a greater angular direction than an angle corresponding to the steering angle and the situation of the curved road of the running destination cannot be confirmed sufficiently in some cases. If the lighting range is controlled to illuminate the running destination prior to the steering operation, the situation of the running destination is confirmed earlier than entrance to the curved road, which is preferable for safe running.

Also in the case in which such a lighting range control is carried out, however, it is preferable that steering should be carried out in one direction on a first curve during running on an S-shaped road and a driver should confirm the coming situation of a next curve before the steering is returned into a straight running direction through the first curve when the steering is operated in an opposite direction on the next curve. In the conventional lighting system, however, the lighting range depends on a steering direction. For this reason, the opposite side to a current steering direction cannot be illuminated and the situation of the next curve cannot be confirmed sufficiently so that there is a problem in respect of safe running. The same problem arises on a crank road in which a right turn and a left turn continue alternately.

SUMMARY OF THE INVENTION

It is an object of the invention to provide a vehicle light apparatus which can automatically carry out a proper control of a lighting range corresponding to the steering operation of the vehicle, thereby performing a preferable illumination for the safe running of the vehicle.

The invention provides a vehicle light apparatus which serves to change a lighting range of lighting means for illuminating a forward part of the vehicle corresponding to a steering angle of the vehicle, comprising lighting range control means for turning the lighting range into an opposite direction to a current steering direction when steering is returned from a steering state into a straight running direction. The lighting range control means controls at least one of a lighting direction and a lighting area of the lighting means, thereby controlling the lighting range. For example, the lighting range control means is set to control a change in the lighting range based on a steering angular velocity. For example, when the steering angular velocity is greater than a predetermined value, setting is carried out to increase a lighting range for illuminating an opposite side following the return of the steering into the straight running direction.

In the invention, moreover, a plurality of lighting means are provided and the lighting range control means controls a lighting range corresponding to the steering angle for a part of the lighting means and controls the other part of the lighting means to turn the lighting range into an opposite direction to a current steering direction when the steering is returned into the straight running direction.

According to the invention, the opposite side to the current steering direction is illuminated by the lighting means when the steering direction is turned from one direction to the opposite direction and the steering operation is carried out comparatively quickly. Therefore, a next curve or the course of an intersection road can be illuminated prior to the steering operation in a running condition on an S-shaped road or the course of an intersection road in which right and left turns continue. Thus, the invention is very effective for maintaining the safe running of the vehicle on a curved road and an intersection road.

BRIEF DESCRIPTION OF THE DRAWINGS

FIG. 4 is a block diagram showing the circuit structure of the lighting system according to the invention;

FIGS. 5A and 5B are light distribution characteristic charts in the case of application to a headlamp;

DETAILED DESCRIPTION OF THE PREFERRED EMBODIMENTS

Figure 1:
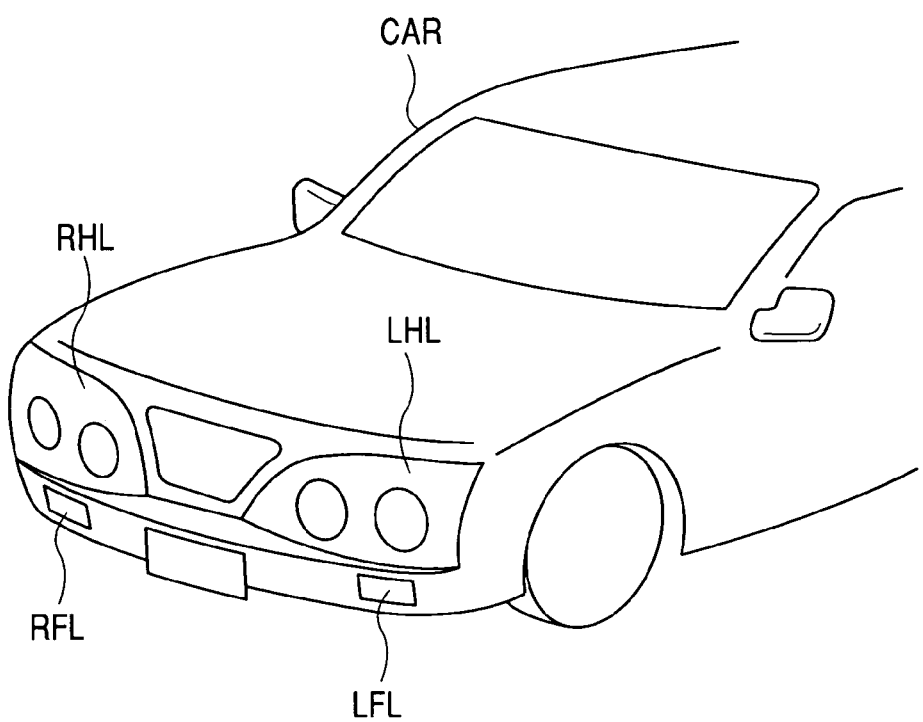
FIG. 1 is a schematic perspective view showing the forward part of a car to which a lighting system according to the invention is applied.

Next, an embodiment of the invention will be described with reference to the drawings. FIG. 1 is a schematic view showing a car to which a vehicle light apparatus according to the invention is applied. A left headlamp LHL and a right headlamp RHL are provided on the left and right in the front part of a body of a car CAR, respectively. Moreover, a left fog lamp LFL and a right fog lamp RFL are provided in lower positions of the head lamps of the body. These lamps have lamp components such as a lamp body, a light source and a reflector which are not particularly restricted, and include a lighting range control mechanism for changing the lighting range thereof as will be described below. Examples of the lighting range control mechanism include a mechanism for controlling a transverse change in the direction of the optical axis of the lamp to be a lighting direction, and a mechanism for controlling a change in the irradiation area of the lamp to be a lighting area. In particular, it is a matter of course that the mechanism capable of controlling a change in the lighting area of the lamp can carry out such a control as to satisfy a light distribution characteristic required for each of a high beam and a low beam in each headlamp. In the light distribution characteristic of the low beam, it is possible to enlarge or reduce the lighting area in a transverse direction. Also in a fog lamp, moreover, it is possible to enlarge or reduce the lighting area in the transverse direction.

Figure 2A:
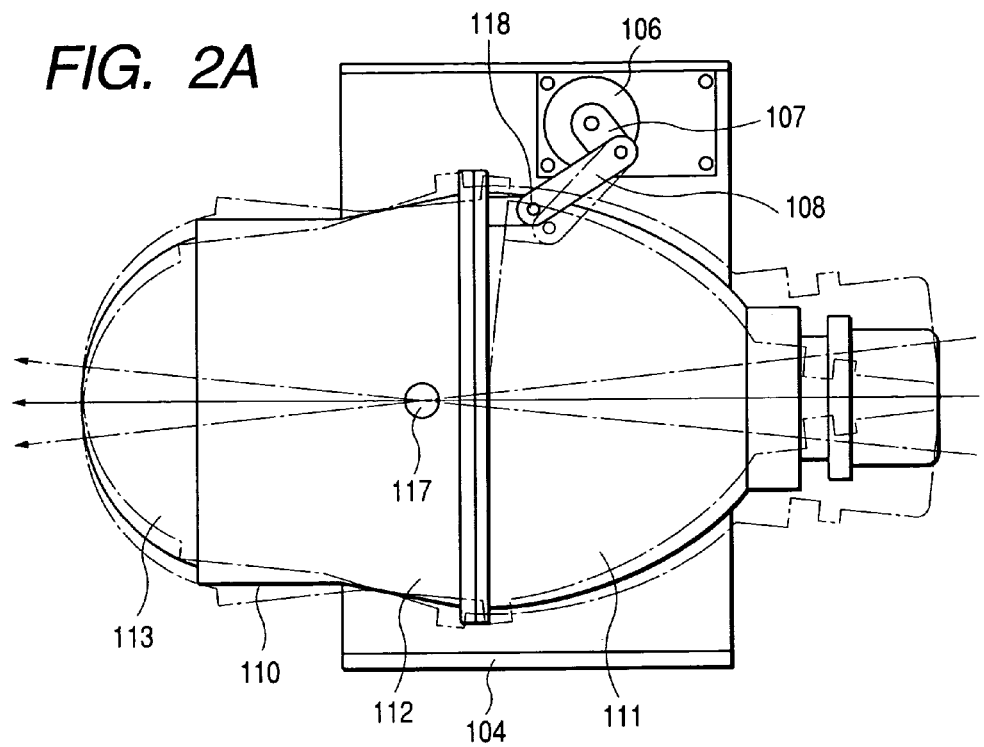
FIGS. 2A and 2B are a plan view and a longitudinal sectional view showing a projector type lamp.
Figure 2B:
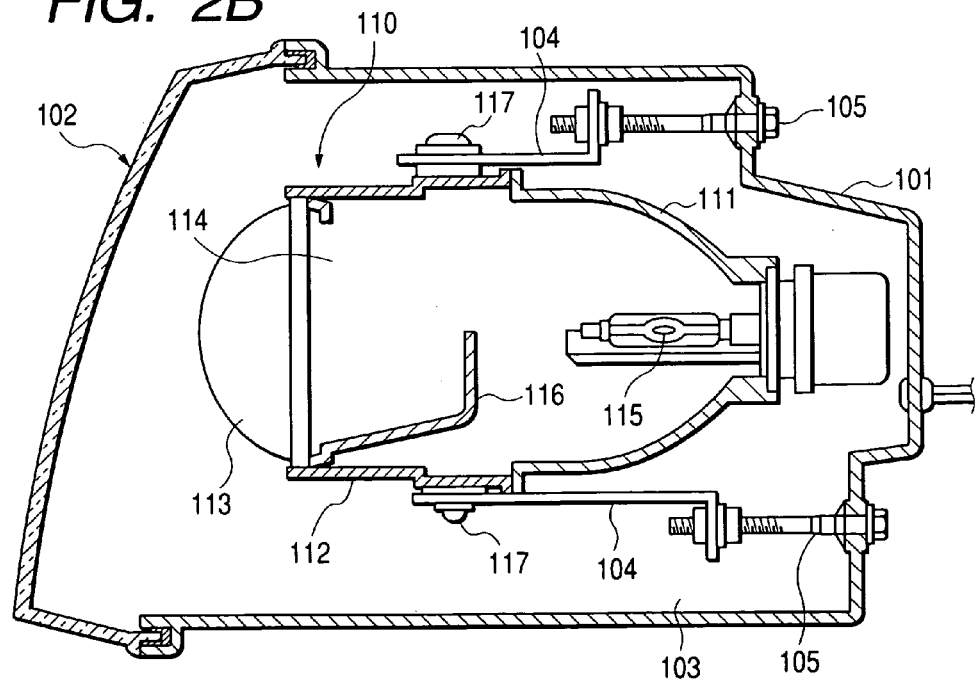

FIGS. 2A and 2B are a plan view and a longitudinal sectional view showing a schematic structure in the case in which the headlamp or the fog lamp is constituted by a projector type lamp and the mechanism for controlling a change in the direction of an optical axis is provided as the lighting range control mechanism of the lamp. More specifically, a projector lamp 110 is provided in a lamp housing 103 constituted by a container-shaped lamp body 101 having a forward part opened and a transparent cover 102 attached to the front opening of the lamp body. In the projector lamp 110, a lamp housing 114 is formed by a reflector 111 taking the shape of a paraboloid of revolution and having an inner part mirror finished as is well known, a cylindrical holder 112 attached to the front opening of the reflector 111, and a condensing lens 113 attached to the front end of the holder 112, a discharge bulb 115 to be a light source is supported on the reflector in the lamp housing 114, and a shade 116 for shielding a part of a light emitted from the discharge bulb 115 to obtain a required light distribution characteristic is supported on the holder 112.

The projector lamp 110 has a pivot shaft 117 erected on the upper and lower surfaces of the holder 102, and is pivotally supported on a support frame 104 provided along the internal wall of the lamp housing 103 with the pivot shaft 117 and can be tilted in a transverse direction over a horizontal plane by using the pivot shaft 117 as a fulcrum. In the embodiment, the support frame 104 is supported with screws 105 in two upper and lower portions with respect to the lamp body 101 respectively and the support frame 104 is tilted in a vertical direction in a vertical plane by manually adjusting the screws 105 so that the optical axis of the projector lamp 110 can be changed in the vertical direction.

Moreover, a motor 106 having a rotating shaft in the vertical direction is fixed into the support frame 104 and a crank 107 is integrally attached to the rotating shaft of the motor 106, and the tip portion of the crank 107 and a pin shaft 118 provided on a part of the upper surface of the projector lamp 110 are coupled to each other through a connecting arm 108. Consequently, a lighting direction control mechanism is constituted and rotating force applied by driving the motor 106 is transmitted to the projector lamp 110 through the crank 107 and the connecting arm 108, and the projector lamp 110 is tilted in a transverse direction around the pivot shaft 117 as shown in a broken line of FIG. 2A so that a change in the direction of the optical axis can be controlled in the transverse direction.

Figure 3A:
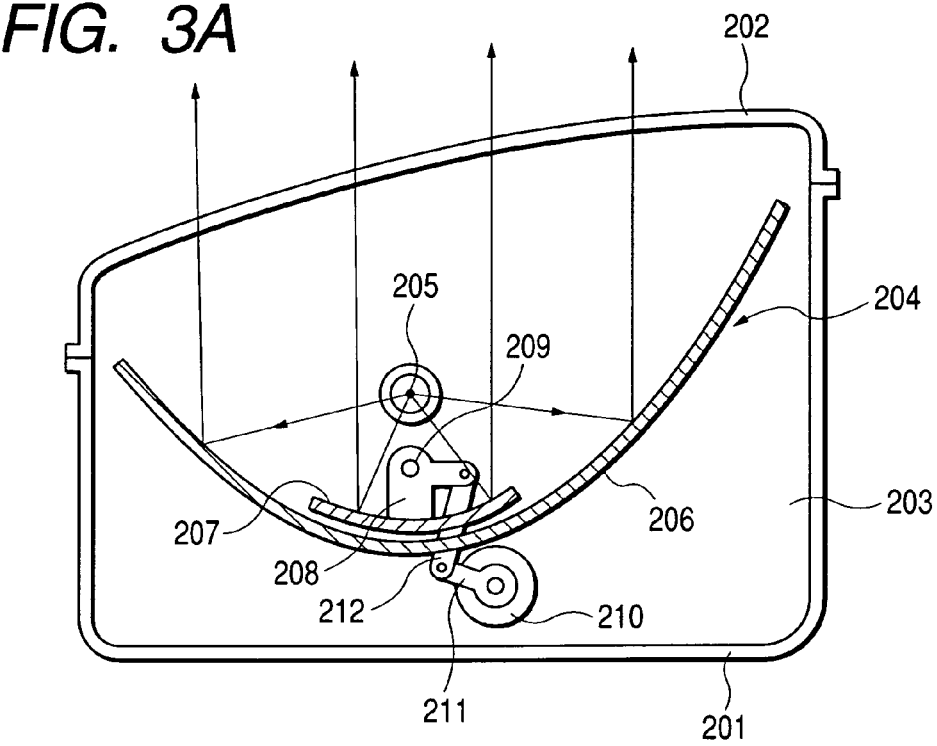
FIGS. 3A and 3B are cross-sectional views showing a reflector type lamp.

FIG. 3A is a cross-sectional view showing a schematic structure in the case in which the headlamp or the fog lamp is constituted by a reflector type lamp and a mechanism for controlling a change in a lighting area is provided as the lighting range control mechanism of the lamp. More specifically, a reflector 204 and a bulb 205 to be a light source are provided in a lamp housing 203 constituted by a container-shaped lamp body 201 having a forward part opened and a lens 202 attached to the forward opening of the lamp body 201, and a light emitted from the bulb 205 is reflected by the reflector 204 and an illumination is carried out in a required lighting area through the lens 202. The reflector 204 is constituted by a main reflector 206 and a subreflector 207 provided to overlap with a partial area in a position on the internal surface side of the main reflector 206 and supported on a support arm 208 which is rotatable in a horizontal direction around a shaft 209 provided in the vicinal position of the bulb.

Figure 3B:
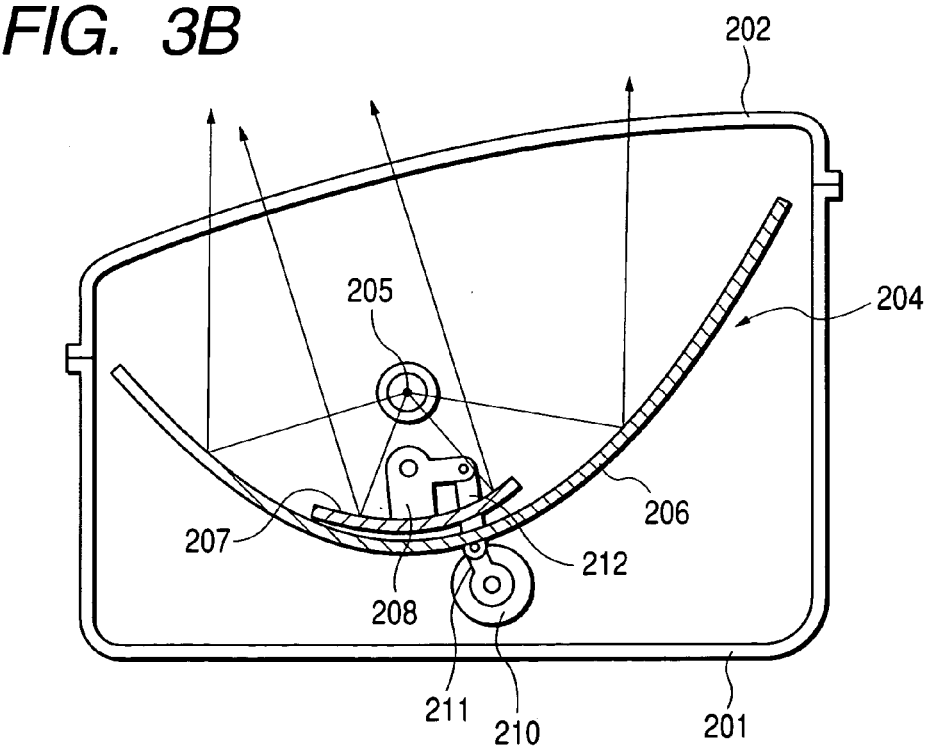

The main reflector 206 is fixedly provided in the lamp body 201. The subreflector 207 is tilted within a small angle range in a transverse direction in a horizontal plane around the shaft 209 by the rotating operation of a motor 210 provided in the lamp body 201 by means of a lighting area control mechanism comprising the motor 210, a crank 211 integrated with the rotating shaft of the motor 210 and a connecting arm 212 for connecting the tip of the crank 211 with a part of the support arm 208. As shown in FIG. 3B, consequently, the motor 210 is rotated to control the tilt angle of the subreflector 207 so that the light which is emitted from the bulb 205 and is reflected by the subreflector 207 is deflected in a left or right direction with respect to the optical axis of the main reflector 206 according to the tilt angle of the subreflector 207 and the deflected light is integrated with the light reflected by the main reflector 206. Thus, the change control can be carried out in such a manner that the lighting area of the whole lamp is enlarged and reduced in the transverse direction.

FIG. 4 is a block diagram showing the circuit structure of a vehicle light apparatus according to the invention in which a lamp L comprising a lighting range control mechanism shown in FIG. 2 or 3 is applied to a headlamp or a fog lamp. A motor M (106, 210) provided in the lighting range control mechanism of the lamp is constituted in such a manner that a rotation is controlled by the supply of a required driving power from a motor driving circuit 20 to be controlled by a controller 10 and a change in a lighting range is thus controlled as described above. The controller 10 inputs the output of a steering sensor 30 provided in a steering wheel of a car and serving to detect the rotating angle of the steering wheel.

The controller 10 comprises an angle calculating section 12 for calculating, from the output of the steering sensor 30, the steering angle of a car, that is, the angle of the steering wheel which is closely related to a steering angle in the straight running direction of the car, and an angular velocity calculating section 13 for calculating the change rate of the steering angle thus calculated, that is, an angular velocity. It is assumed that the steering angle is an angle turned in the right or left direction with an angle in the straight running direction set to be zero degree. For example, the right direction is set to be a plus angle and the left direction is set to be a minus angle. Each of the outputs of the angle calculating section 12 and the angular velocity calculating section 13 is sent to a central processing unit (CPU) 11 and the CPU 11 serves to set the lighting range of the lamp L based on these information and to send a control signal to the motor driving circuit 20 based on the setting. The CPU 11 includes an angular velocity comparing function of comparing an angular velocity input from the angular velocity calculating section 13 with a preset velocity. When the lighting range of the lamp L is to be set in the CPU 11, moreover, the rotating angle position of the motor M provided in the lamp L may be fed back as information about a current lighting range set in the lamp, for example, information about the direction of an optical axis as shown in a broken line of FIG. 4.

Figure 6:
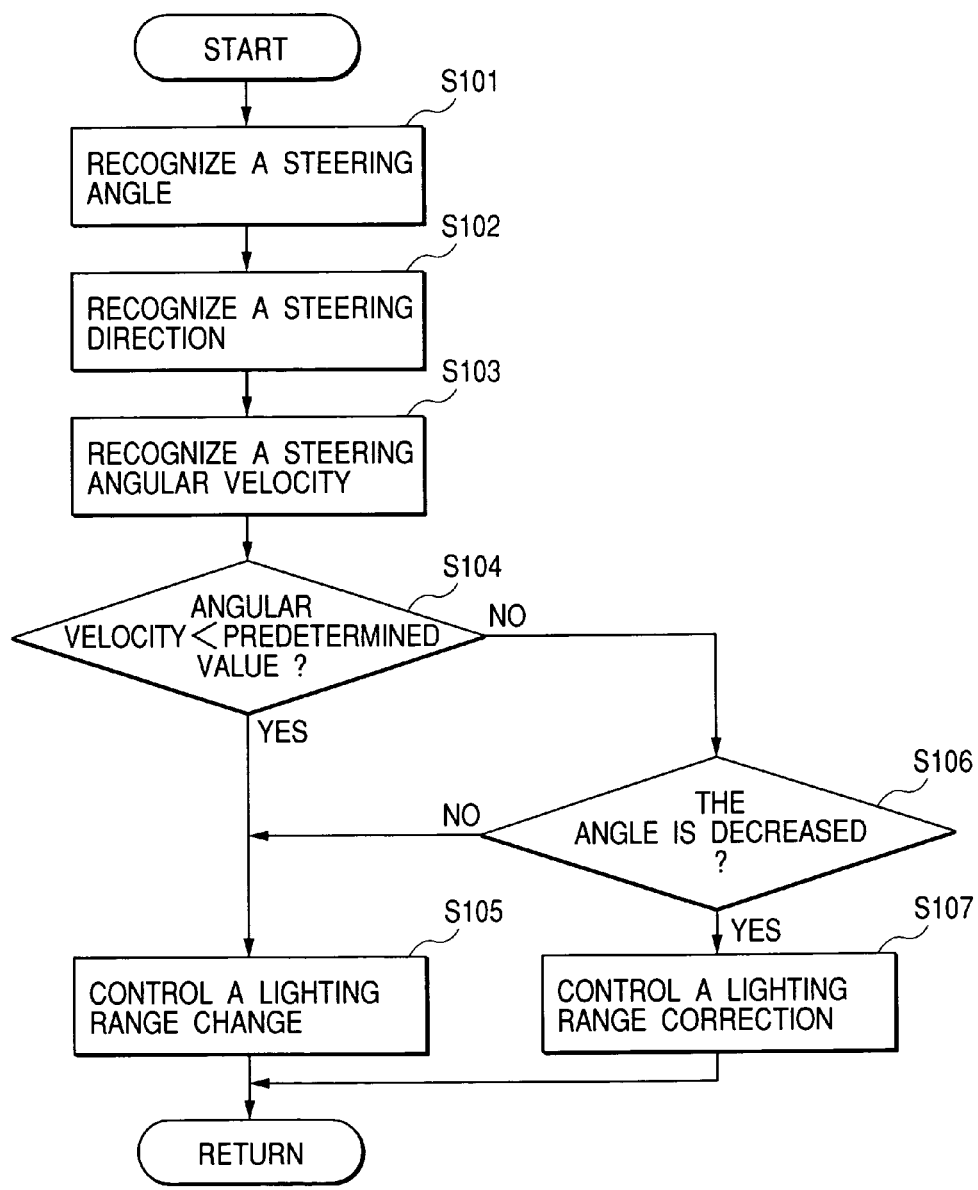
FIG. 6 is a flow chart for explaining a lighting range control operation.
Figure 7:
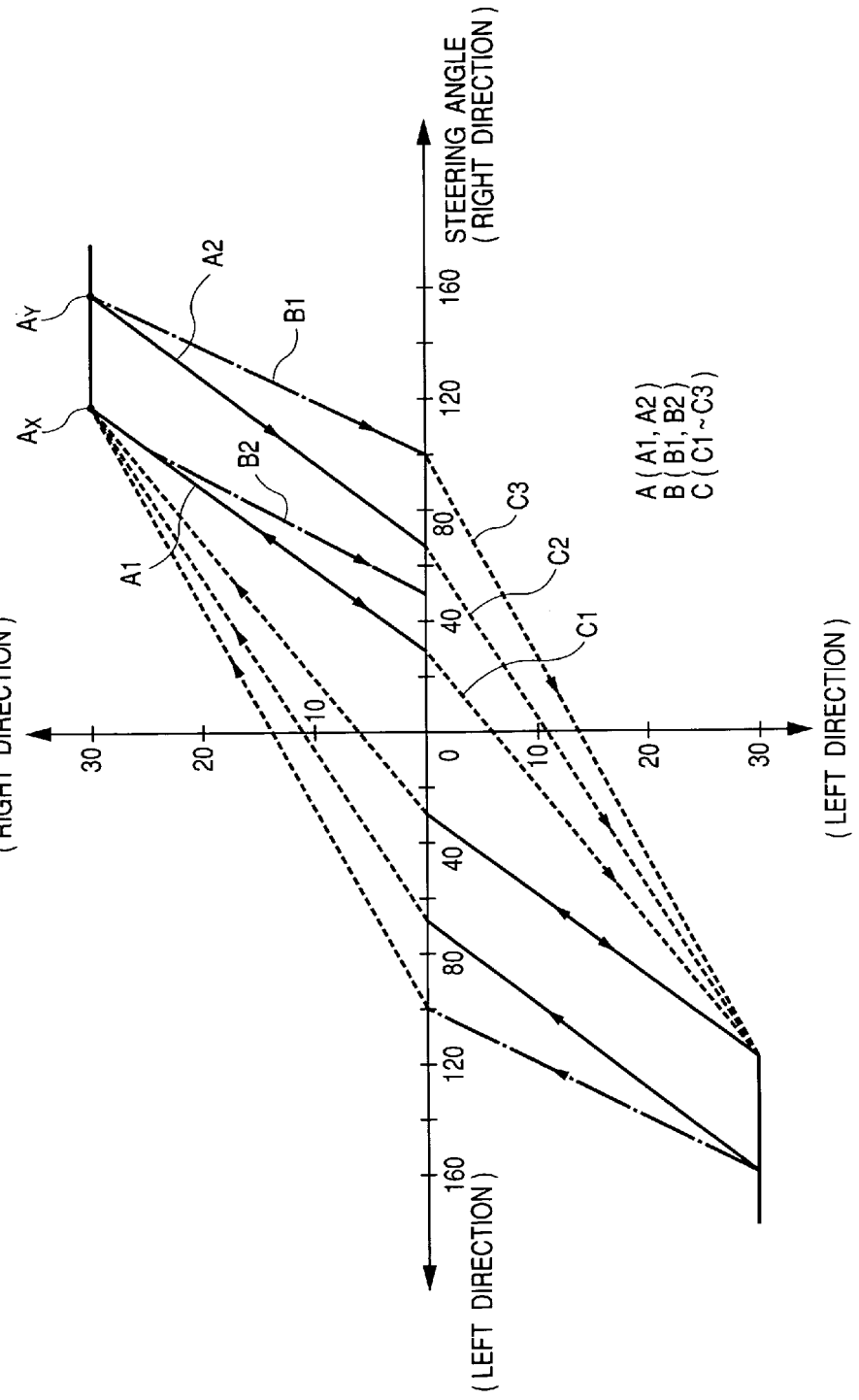
FIG. 7 is a chart showing a correlation between a steering angle and a lighting direction.

Description will be given to an operation for controlling a lighting range in the lighting system having the above-mentioned structure. First of all, description will be given to the case in which a projector type lamp shown in FIG. 2 is constituted as a headlamp. FIG. 5A is a light distribution characteristic chart indicating a lighting range in a normal condition with the low beam of the headlamp, resulting in a light distribution in a lighting area in which a right half is downward stepped in a straight running direction. FIG. 6 is a flow chart for explaining a control operation, and FIG. 7 is a chart showing a correlation between a steering angle and the optical axis of a lamp which is changed by a lighting range control mechanism. In FIG. 6, first of all, a steering angle calculated from the output of the steering sensor by the angle calculating section is recognized (S101). Moreover, whether a steering direction, that is, a current steering angle position is present in a right steering area (steering in a right direction) or a left steering area (steering in a left direction) is recognized based on a change in the steering angle (S102). Furthermore, a steering angular velocity calculated from the change in the steering angle by the angular velocity calculating section is recognized (S103). Then, the steering angular velocity is compared with a predetermined value (S104). When the steering angular velocity is smaller than the predetermined value, the CPU executes the lighting range change control of a lamp according to the steering angle (S105).

In the lighting range change control S105, the lighting direction of the lamp L, that is, the direction of the optical axis of the lamp L is set and the motor control circuit 20 is driven to turn the lamp L into the direction of the optical axis thus set, thereby executing the lighting direction change control. A characteristic in a lighting direction with respect to a steering angle in this case is shown in a solid line of FIG. 7. In an example of FIG. 7, a so-called play is given and a change control is not carried out before a predetermined angle, that is, 30 degrees in this example is exceeded in a transverse direction from zero degree at which the steering angle is set into a straight running direction, and the change control in a lighting direction is executed for an area exceeding 30 degrees. In the case in which the steering angle is slightly changed during straight running, consequently, the optical axis of the lamp can be prevented from being changed.

Figure 8A:
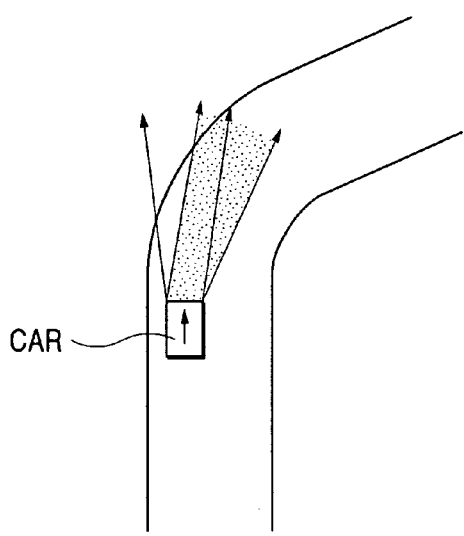
FIGS. 8A, 8B and 8C are views for explaining a lighting range on a curved road

More specifically, a projector type lamp is tilted rightwards or leftwards in a lamp housing by the rotation control of the motor, and the direction of the optical axis of the lamp is changed in such a direction as to follow the steering angle as shown in FIG. 5B. As shown in FIGS. 8A and 8B, consequently, the direction of the optical axis of the headlamp is turned into the running direction of a car according to the steering angle as is dotted in each drawing during the running of a car CAR on a curved road or a right or left turn on an intersection road, which is preferable for maintaining safe running. As shown in FIG. 7, the characteristic of a change in the optical axis of the lamp in this case is changed linearly based on a tilt characteristic shown in a solid line A1. A maximum angle in the direction of the optical axis of a headlamp is preset to 30 degrees rightwards and leftwards in this example, and the direction of the optical axis of the lamp is not changed even if the steering angle is increased after a point Ax at which the maximum angle is reached. When the steering is operated in an opposite direction, the direction of the optical axis of the lamp is decreased along a characteristic A1 if a position in the current direction of the optical axis of the lamp is present on the characteristic A1, the direction of the optical axis of the lamp is decreased with a characteristic having an equal tilt angle as that of the characteristic A1 from a position between points Ax and Ay having a maximum angle, and the direction of the optical axis of the lamp is decreased in a straight running direction based on a characteristic A2 having an equal tilt angle to that of the characteristic A1 if the direction of the optical axis of the lamp has a maximum angle and the steering angle is greater than that of the point Ay, and the steering angle is reduced to the point Ay with the maximum angle maintained in the characteristic of FIG. 7.

On the other hand, when the steering angular velocity is greater than the predetermined value in the step S104, it is decided whether the absolute value of the steering angle is increased or decreased (S106). The increase in the absolute value of the steering angle indicates a state in which steering is carried out in the same direction as a current steering direction, and the decrease in the steering angle indicates a state in which the steering is carried out in a reverse direction to the current steering direction, that is, such a direction as to return to a straight running direction. If the steering angle is increased, the lighting range change control (S105) is executed. If the steering angle is decreased, a lighting range correction control (S107) is executed. More specifically, in the case in which the steering wheel is rotated at a comparatively high speed in the opposite direction to the current steering direction, the lighting range correction control is executed in a running condition in which the direction of the optical axis of the lamp is preferably turned toward the opposite side rapidly, for example, such a running condition as to make a turn on a first curve of an S-shaped road and to then enter a next curve as shown in FIG. 8C or a running condition in which right and left turns continue on an intersection road.

In the lighting range correction control S107, the optical axis of the lamp is turned toward the opposite side to the steering direction immediately after the direction of the optical axis of the lamp is returned to the straight running direction by the lighting range change control as shown in a broken line C of FIG. 7. More specifically, the same control as the lighting range change control in the step S105 is executed with characteristics shown in solid lines A1 and A2 before the direction of the optical axis of the lamp is returned to the straight running direction by the steering operation, and the so-called play is eliminated and the direction of the optical axis of the lamp is turned toward the opposite side to the current steering direction to carry out a change control with a gentler change characteristic after the direction of the optical axis of the lamp is turned into the straight running direction. In FIG. 7, the change control is carried out based on characteristics shown in broken lines C1 and C2 when the direction of the optical axis of the lamp is returned to the straight running direction based on the characteristics A1 and A2. The direction of the optical axis of the lamp can be recognized based on control information in the CPU 11 when the motor M (106, 210) provided in the lamp shown in FIGS. 2 and 3 is to be opened in the CPU 11 controlling the rotating position of the motor M, and can be recognized in response to a signal sent from the motor M when the motor M is to be fed back.

Figure 8C:
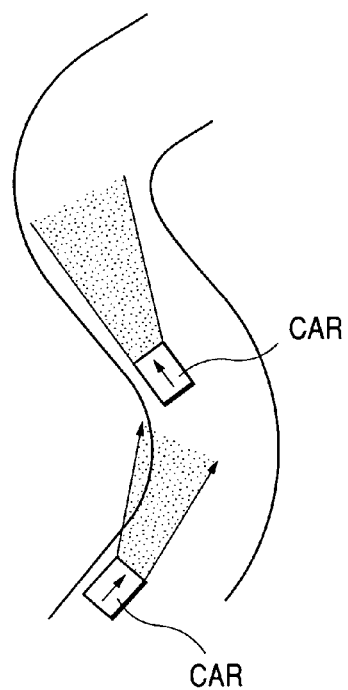
Figure 8B:
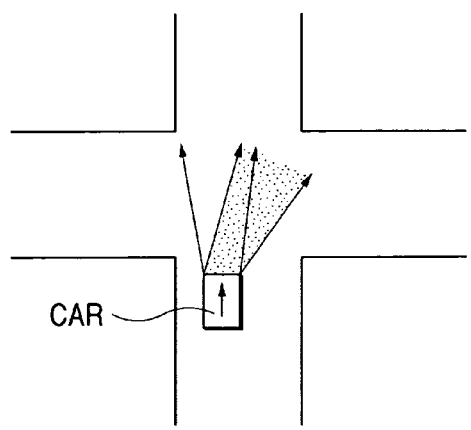

In the case in which the car is running on the road shown in FIG. 8C, consequently, the direction of the optical axis of the lamp is further turned in a next curve direction on the opposite side after returning to the straight running direction if the steering wheel is started to be operated in the opposite direction when making a turn on a first curve and entering a next curve. This operation is carried out in such a manner that a lighting range on the opposite side is enlarged with the operation of the steering wheel in the opposite direction. When a driver is to confirm a running direction prior to an operation for changing the steering angle to a predetermined angle, consequently, the forward course of the curve can be suitably illuminated so that safe running can be enhanced still more.

While the same control as the lighting range change control is carried out until the direction of the optical axis of the lamp is returned to the straight running direction in the embodiment, it is also possible to increase the change angle of the direction of the optical axis of the lamp, that is, a tilt angle while the direction of the optical axis of the lamp is turned into the straight running direction corresponding to a current steering angle and to greatly change the direction of the optical axis of the lamp with a small steering angle as in a characteristic shown in a chain line B1 of FIG. 7. In this case, when the direction of the optical axis of the lamp is present on the characteristic A1, it is returned to the straight running direction based on a characteristic B2 having the same tilt angle as that of the characteristic B1. Alternatively, when the direction of the optical axis of the lamp is present between the points Ax and Ay, it is returned based on a characteristic (not shown) having the same tilt angle as that of the characteristic B1. Consequently, the opposite side to the current steering direction can be illuminated earlier.

Figure 9A:
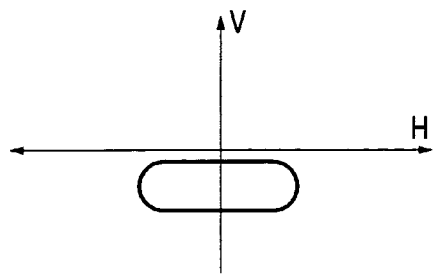
FIGS. 9A and 9B are light distribution characteristic charts in the case of application to a fog lamp.
Figure 9B:
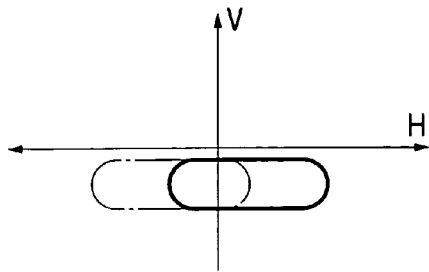

The foregoing is the same as in the case in which the projector type lamp is used as a fog lamp. The light distribution characteristic of the lamp in this case is shown in FIGS. 9A and 9B. More specifically, the direction of the optical axis of the fog lamp is deflected in a transverse direction corresponding to a steering angle, and furthermore, a lighting range correction control is executed when steering is operated in an opposite direction with a steering angular velocity greater than a predetermined value. Thus, the direction of the optical axis of the lamp is rapidly turned toward the opposite side and a course is quickly illuminated on a curved road or an intersection road so that a driver can maintain safe running.

Figure 10A:
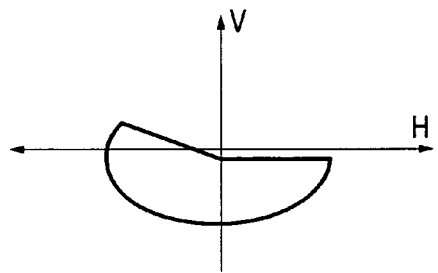
FIGS. 10A and 10B are light distribution characteristic charts showing different lighting range control operations in the case of application to a headlamp.
Figure 10B:
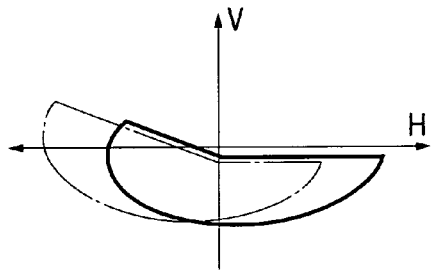

Next, description will be given to the case in which the reflector type lamp shown in FIG. 3 is constituted as ahead lamp. FIG. 10A is a light distribution characteristic chart showing a lighting range in a normal condition with the low beam of the headlamp, resulting in a light distribution in a lighting area in which a right half is downward stepped in a straight running direction. Also in the embodiment, a lighting range change control is executed based on the flow chart of FIG. 6. In the embodiment, the CPU 11 drives the motor control circuit 20 such that the lighting area of the lamp, that is, the light distribution characteristic of the lamp is set to have a desirable lighting area in the lighting range change control of the step S105 and the lighting range correction control of the step S106. In the lamp, consequently, the subreflector 207 is tilted by the motor 210 and the direction of reflection of a light emitted from the bulb 205 and reflected by the subreflector 207 is changed. Therefore, the lighting area of the whole lamp is changed. In this case, the lighting area is enlarged in a right or left direction as shown in FIG. 10B. The lighting area to be enlarged is increased with an increase in the steering angle. For this reason, a central optical axis is deflected in a transverse direction in the whole lamp and an equivalent control to the control based on the characteristic A shown in FIG. 7 is substantially carried out. In the same manner as in the embodiment, consequently, the optical axis of the headlamp is turned in the running direction of a car according to the steering operation during the running of the car on a curved road or right and left turns on an intersection road, which is preferable for maintaining safe running.

In the case in which the operation is carried out in the opposite direction with the steering angular velocity greater than the predetermined value, moreover, the lighting range correction control S106 is executed so that an equivalent control to a control based on the characteristic C shown in FIG. 7 is substantially carried out. Consequently, the lighting area is enlarged in the transverse direction toward the opposite side to the steering direction. Thus, a course on a curved road or an intersection road can be illuminated rapidly and a driver can maintain the safe running.

Figure 11A:
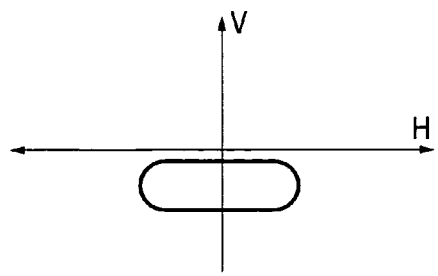
FIGS. 11A and 11B are light distribution characteristic charts showing different lighting range control operations in the case of the application to the fog lamp.
Figure 11B:
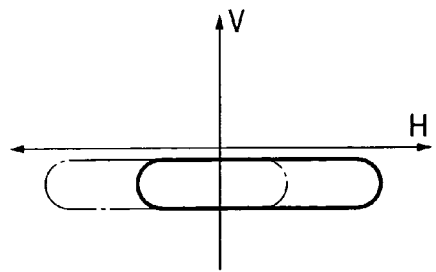

Also in the case in which the reflector type lamp shown in FIG. 3 is constituted as a fog lamp, the same operation is carried out. A normal lighting area shown in FIG. 11A is enlarged in a right or left direction as in FIG. 11B according to a steering angle.

Figure 12:
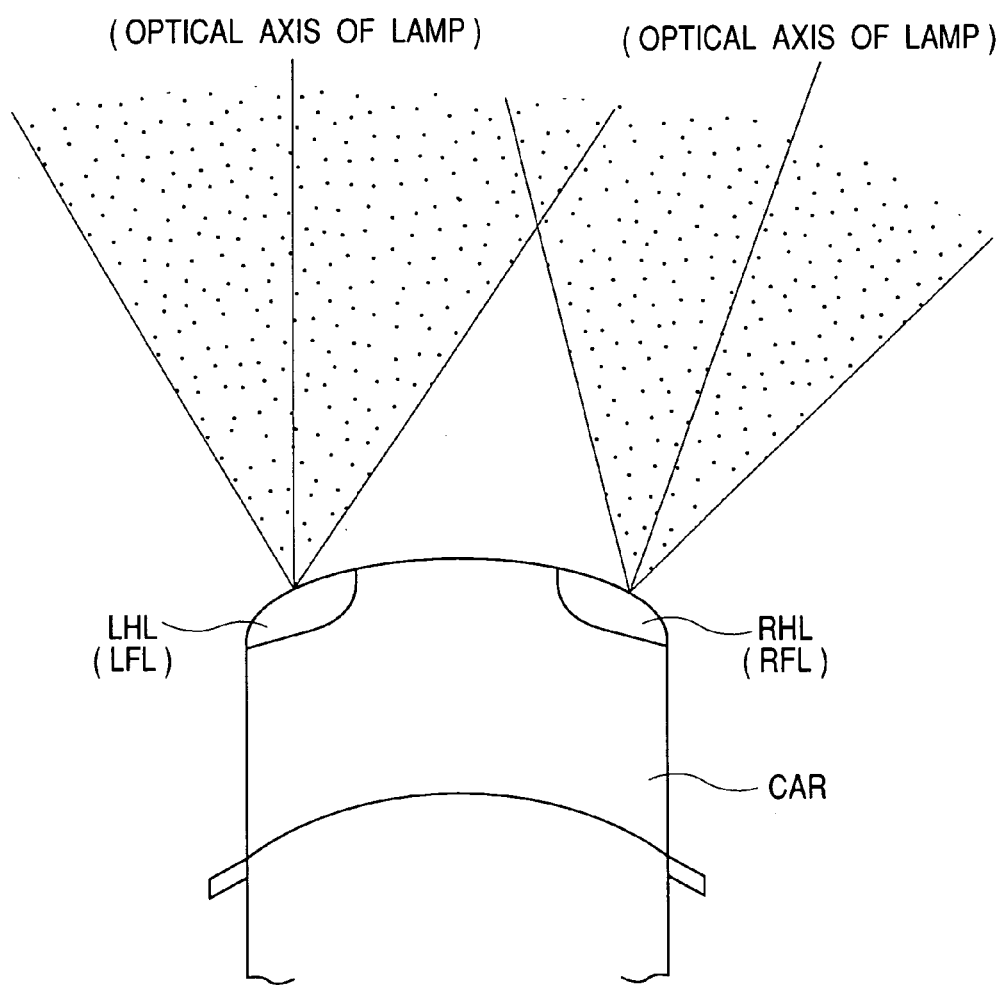
FIG. 12 is a conceptual view illustrating an embodiment of application to a plurality of lamps.

In the invention, furthermore, the lighting range correction control in each of the embodiments may be carried out for one of the left and right headlamps LHL and RHL or the left and right fog lamps LFL and RFL in the car CAR shown in FIG. 1. More specifically, in a conceptual structure shown in FIG. 12, both lamps, that is, the left and right headlamps LHL and RHL control the lighting range corresponding to the steering angle. In the case in which the steering direction is set to the left direction and the steering operation is carried out in the right direction, the direction of the optical axis of the lamp is turned into the opposite direction to the current steering direction or the lighting area is enlarged when the steering angle is decreased for one of the lamps, that is, only the right headlamp RHL and the steering is thereby returned into the straight running direction. Thus, the correction control for turning the lighting range is carried out. In this case, the lighting range change control is carried out by the left headlamp LHL so that the illumination in the current steering direction is maintained. Consequently, the viewing range of a driver can be more increased so that the safe running can be enhanced effectively.

Figure 13:
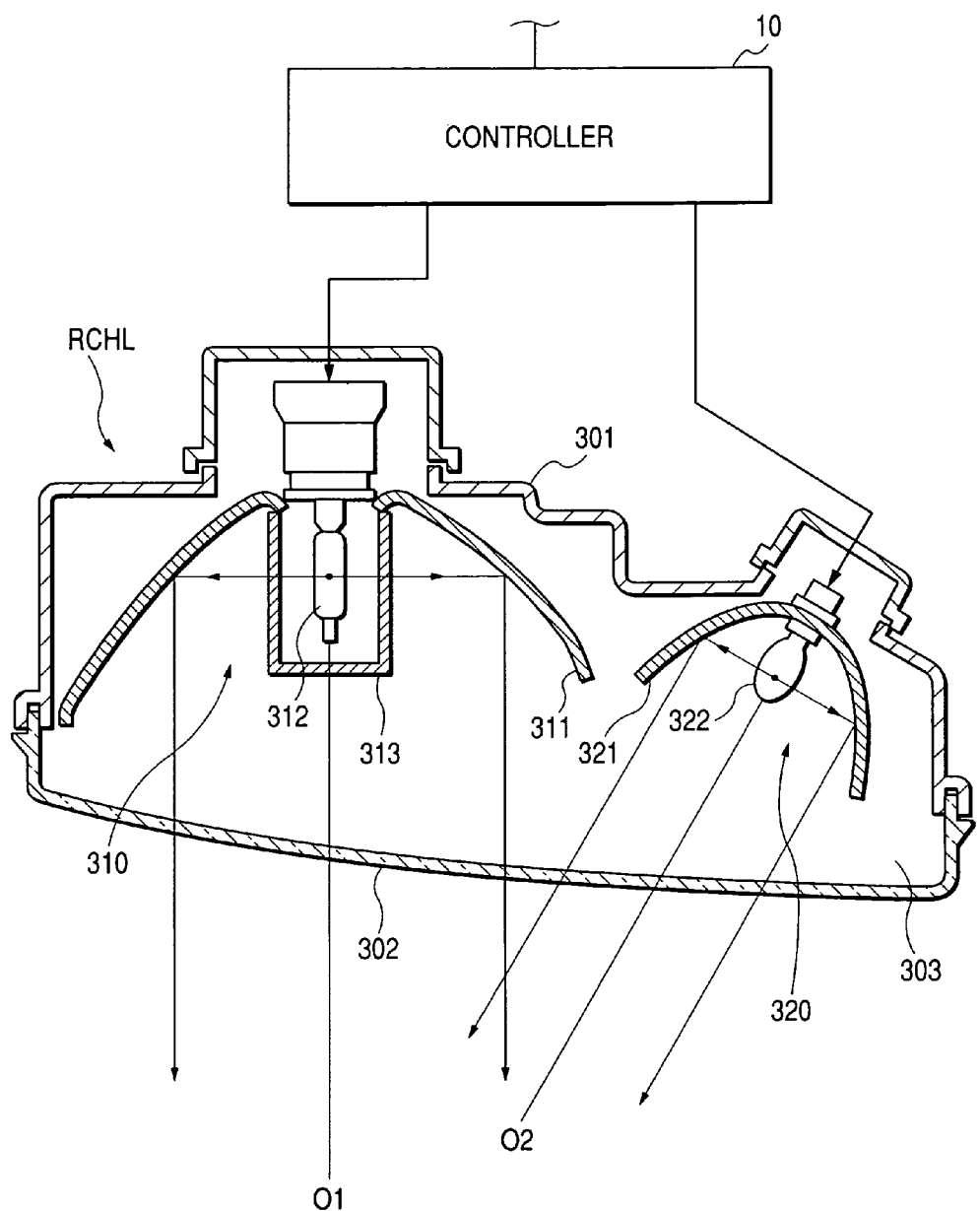
FIG. 13 is a sectional view showing a headlamp according to another embodiment of the invention.

The lamp according to the invention is not restricted to the projector type lamp and the reflector type lamp but the invention can also be applied to a lamp capable of controlling a change in a lighting direction or a lighting area. For example, a lamp shown in FIG. 13 is constituted as aright compound headlamp RCHL of a car in which a plurality of lamps having optical axes turned in different directions are compounded, and a low beam lamp 310 of the headlamp and a lighting direction and area adjusting lamp 320 are provided in a lamp housing 303 constituted by a lighting body 301 and a lens 302. The low beam lamp 310 is the same as a low beam lamp of a conventional headlamp, and comprises a reflector 311, a bulb 312 and a shade 313 and has an optical axis O1 turned in the straight running direction of the car. The lighting direction and area adjusting lamp 320 comprises a reflector 321 and a bulb 322 and has an optical axis O2 turned in a right direction from the straight running direction of the car. The bulbs 312 and 322 of the lamps 310 and 320 are connected to a controller 10 and the ON/OFF and luminance (brightness) of the bulbs 312 and 322 can be controlled by the controller 10. Various sensors are connected to the controller 10 in the same manner as the controller 10 described in each of the embodiments and description thereof will be omitted. Moreover, it is apparent that a left compound headlamp is formed symmetrically, which is not shown.

In the case in which a lighting direction is not changed in the right compound headlamp RCHL, only the low beam lamp 310 is turned on to carry out an illumination in the straight running direction of the car. In the case in which the lighting direction is to be changed, the lighting direction and area adjusting lamp 320 is also started to be turned on and a brightness thereof is gradually increased with an increase in a steering angle, while the brightness of the low beam lamp 310 is reduced. Consequently, the illumination is carried out in such a state that a light emitted from the low beam lamp 310 and turned in the straight running direction and a light emitted from the lighting direction and area adjusting lamp 320 and turned in the right direction are integrated. As a result, the lighting direction for the right compound headlamp RCHL is changed in the right direction. At this time, moreover, the lighting area of the low beam lamp 310 partially overlaps with the lighting area of the lighting direction and area adjusting lamp 320. Therefore, the lighting area is changed in an enlarging direction. According to circumstances, when the lighting direction and area adjusting lamp 320 is turned on, the low beam lamp 310 may be turned off. In this case, an illumination is carried out by only the lighting direction and area adjusting lamp 320 in the lighting area of the right compound headlamp RCHL. When the lighting areas of the low beam lamp 310 and the lighting direction and area adjusting lamp 320 are equal to each other, it is also possible to change only the lighting direction without changing the lighting area of the right compound headlamp RCHL.

While the example in which a steering angle and an angular velocity are detected by a steering sensor for detecting the rotating angle of a steering wheel has been described in the embodiments, other sensors can also be utilized if a steering angle of a steering wheel or a steering device can be detected.

As described above, the vehicle light apparatus according to the invention changes the lighting range of lighting means for illuminating the forward part of a vehicle corresponding to the steering angle of the vehicle, and illuminates the opposite side to a current steering direction by the lighting means when a steering direction is turned from one direction to the opposite direction and a steering operation is carried out comparatively quickly. Therefore, a next curve or the course of an intersection road can be illuminated prior to the steering operation in a running condition on an S-shaped road or an intersection road in which right and left turns continue. Thus, the vehicle light apparatus is very effective for maintaining the safe running of the vehicle on a curved road and an intersection road.

What is claimed is:

1. A vehicle light apparatus comprising:
    lighting means which illuminates forward of a vehicle; and
    lighting range control means which changes a lighting range of said lighting means in response to a steering angle of the vehicle, wherein:
    when a first condition is satisfied, the lighting range control means immediately turns the lighting range into an opposite direction to a current steering direction when steering is returned from a steering state into a straight running direction; and
    when the first condition is satisfied, the lighting range control means carries out a change control of the lighting range with a lesser rate of change in the opposite direction than when the first condition is not satisfied.

2. The vehicle light apparatus according to claim 1, wherein said lighting range control means controls at least one of a lighting direction and a lighting area of said lighting means, thereby controlling the lighting range.

3. The vehicle light apparatus according to claim 1, wherein said lighting range control means controls the lighting range based on a steering angular velocity.

4. The vehicle light apparatus according to claim 1, wherein changing of the lighting range when steering angle is increasing is controlled to be greater than that when the steering angle is decreasing.

5. The vehicle light apparatus according to claim 1, wherein the first condition is satisfied when a steering angular velocity is greater than a predetermined value and when an absolute value of the steering angle is decreased.

6. The vehicle light apparatus according to claim 1, wherein the lesser rate of change comprises a smaller amount of turning of the lighting range per unit of change in steering angle.

7. The vehicle light apparatus according to claim 1, wherein a plurality of lighting means are provided and said lighting range control means controls a lighting range corresponding to the steering angle for a part of the lighting means and controls the other part of the lighting means to turn the lighting range into an opposite direction to a current steering direction when the steering is returned into the straight running direction.

8. The vehicle light apparatus according to claim 2, wherein said lighting range control means controls the lighting range based on a steering angular velocity.

9. The vehicle light apparatus according to claim 3, wherein the lighting range control means increases the lighting range for illuminating an opposite side following the return of the steering into the straight running direction when the steering angular velocity is greater than a predetermined value.

10. The vehicle light apparatus according to claim 8, wherein the lighting range control means increases the lighting range for illuminating an opposite side following the return of the steering into the straight running direction when the steering angular velocity is greater than a predetermined value.

11. The vehicle light apparatus according to claim 7, wherein said lighting range control means controls at least one of a lighting direction and a lighting area of said lighting means, thereby controlling the lighting range.

12. The vehicle light apparatus comprising:
lighting means which illuminates forward a vehicle; and
lighting range control means which changes a lighting range of said lighting means in response to a steering angle of the vehicle, and turns the lighting range into an opposite direction to a current steering direction when steering is returned from a steering state into a straight running direction,
wherein said lighting range control means controls the lighting range based on a steering angular velocity.

13. The vehicle light apparatus according to claim 12, wherein the lighting range control means increases the lighting range for illuminating an opposite side following the return of the steering into the straight running direction when the steering angular velocity is greater than a predetermined value.

14. The vehicle light apparatus according to claim 12, wherein said lighting range control means controls at least one of a lighting direction and a lighting area of said lighting means, thereby controlling the lighting range.

15. The vehicle light apparatus according to claim 14, wherein the lighting range control means increases the lighting range for illuminating an opposite side following the return of the steering into the straight running direction when the steering angular velocity is greater than a predetermined value.

16. A vehicle light apparatus comprising:
lighting means which illuminates forward a vehicle; and
lighting range control means which changes a lighting range of said lighting means in response to a steering angle of the vehicle, and turns the lighting range into an opposite direction to a current steering direction when steering is returned from a steering state into a straight running direction,
wherein a plurality of lighting means are provided and said lighting range control means controls a lighting range corresponding to the steering angle for a part of the lighting means and controls the other part of the lighting means to turn the lighting range into an opposite direction to a current steering direction when the steering is returned into the straight running direction.

17. The vehicle light apparatus according to claim 16, wherein said lighting range control means controls at least one of a lighting direction and a lighting area of said lighting means, thereby controlling the lighting range.

18. A vehicle light apparatus comprising;
lighting means which illuminates forward a vehicle; and
lighting range control means which changes a lighting range of said lighting means in response to a steering angle of the vehicle, and turns the lighting range into an opposite direction to a current steering direction when steering is returned from a steering state into a straight running direction,
wherein changing of the lighting range when the steering angle is increasing is controlled to be greater than that when the steering angle is decreasing.

\* \* \* \* \*